US012574805B2

(12) United States Patent
Dai et al.

(10) Patent No.: US 12,574,805 B2
(45) Date of Patent: Mar. 10, 2026

(54) METHODS AND APPARATUSES FOR DATA TRANSMISSION FOR MULTICAST BROADCAST SERVICE

(71) Applicant: LENOVO (BEIJING) LIMITED, Beijing (CN)

(72) Inventors: Mingzeng Dai, Shanghai (CN); Lianhai Wu, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 306 days.

(21) Appl. No.: 18/040,060

(22) PCT Filed: Jul. 31, 2020

(86) PCT No.: PCT/CN2020/106268
§ 371 (c)(1),
(2) Date: Jan. 31, 2023

(87) PCT Pub. No.: WO2022/021350
PCT Pub. Date: Feb. 3, 2022

(65) Prior Publication Data
US 2023/0284101 A1      Sep. 7, 2023

(51) Int. Cl.
*H04W 36/00* (2009.01)
*H04W 36/02* (2009.01)
(52) U.S. Cl.
CPC . *H04W 36/00222* (2023.05); *H04W 36/0007* (2018.08); *H04W 36/0235* (2023.05)

(58) Field of Classification Search
CPC ....... H04W 36/00222; H04W 36/0007; H04W 36/0235
See application file for complete search history.

(56) References Cited

U.S. PATENT DOCUMENTS

| | | | | |
|---|---|---|---|---|
| 2005/0169205 A1* | 8/2005 | Grilli | ............... | H03M 13/2703 |
| | | | | 370/313 |
| 2021/0045029 A1* | 2/2021 | Ryu | ...................... | H04W 36/12 |
| 2022/0256412 A1* | 8/2022 | Kim | ...................... | H04W 28/06 |
| 2023/0023919 A1* | 1/2023 | Qi | ......................... | H04W 72/30 |

FOREIGN PATENT DOCUMENTS

| | | |
|---|---|---|
| CN | 101090392 A | 12/2007 |
| CN | 101400028 A | 4/2009 |

(Continued)

OTHER PUBLICATIONS

ZTE et al. "Discussion on the scope of NR MBS RP-200818" 3GPP TSG RAN Meeting #88e, Jul. 3, 2020; pp. 1-3.

(Continued)

*Primary Examiner* — Kenny S Lin
(74) *Attorney, Agent, or Firm* — AMPACC Law Group, PLLC

(57) ABSTRACT
Disclosed are methods for multicast broadcast service. One embodiment of the subject application provides a method performed by a UE, comprising receiving data packets in a first cell in a first mode, sending a data receiving status report during or after a handover and/or during or after a data transmission mode switching, receiving missing data packets during the data transmission mode switching and/or during the handover, and receiving data packets in a second cell in a second mode. Related apparatuses are also disclosed.

20 Claims, 14 Drawing Sheets

(56)  References Cited

FOREIGN PATENT DOCUMENTS

| | | | | | |
|---|---|---|---|---|---|
| CN | 101557559 | A | | 10/2009 | |
| CN | 102695130 | A | | 9/2012 | |
| CN | 104937963 | A | | 9/2015 | |
| CN | 108924876 | A | * | 11/2018 | ........... H04L 1/1642 |
| WO | 2008037810 | A1 | | 4/2008 | |
| WO | WO-2013117128 | A1 | * | 8/2013 | ............ H04W 36/00 |

OTHER PUBLICATIONS

International Search Report and Written Opinion dated Apr. 26, 2021 for International Application No. PCT /CN2020/106268.
European examination report dated Apr. 15, 2025 for European patent application No. 20947419.6.
Oppo "Discussion on eMBB-based handover for NR mobility", 3GPP TSG-RAN WG2 Meeting #107 R2-1909671;Aug. 30, 2019; 6 pages.
Lenovo, Motorola Mobility, InterDigital Inc."Remaining MAC Issues" 3GPP TSG RAN WG2 Meeting#110-e R2-2005039; Jun. 12, 2020; 10 pages.
ZTE "Further Discussion and TS38.401 TP on Multi-Connectivity with DualMultiple gNB-DUs" 3GPP TSG RAN WG3#100 R3-183384; May 25, 2018; 5 pages.
Supplementary European Search Report dated Feb. 29, 2024 for European Patent Application No. 20947419.6.
Institute for Information Industry (III), "Class level scheme for SC-PTM retransmission", 3GPP TSG-RAN WG2 Meeting #90 R2-152376, May 29, 2015, 4 pages, Fukuoka, Japan.

* cited by examiner

100

110     receiving data packets in a first cell in a first mode 120     sending a data receiving status report 130     receiving missing data packets 140     receiving data packets in a second cell in a second mode

710

720

UE

BS data packets received in a first mode in a first cell

730 handover mode configuration for the second mode

740 data receiving status report

750 missing data packets

760 data packets received in a second mode in a
second cell

1000

| 1010 | transmitting data packets in a first mode in a first cell |

| 1020 | receiving a data reception status report |

| 1030 | transmitting missing data packets |

| 1040 | transmitting data packets in a second cell in a second mode |

1100

| 1110 | transmitting data packets in a first mode in a first cell |

| 1120 | sending a MBS receiving status to a target BS during a handover |

| 1130 | stopping transmitting data packets in the first mode in the first cell |

1200

1210    receiving a MBS receiving status associated with a data transmission in the first mode from a source BS 1220    deciding a second mode and sending corresponding mode configuration 1230    receiving a data receiving status report 1240    transmitting the missing data packets 1250    transmitting data packets in the second mode

1300

METHODS AND APPARATUSES FOR DATA TRANSMISSION FOR MULTICAST BROADCAST SERVICE

CROSS REFERENCE TO RELATED APPLICATIONS

This application is a national phase entry of International Application No. PCT/CN2020/106268, filed on Jul. 31, 2020, which is incorporated by reference in its entirety.

TECHNICAL FIELD

Various example embodiments relate to methods and apparatuses for data transmission for multicast broadcast service (MBS).

BACKGROUND OF THE INVENTION

In 3GPP (3$^{rd}$ Generation Partnership Project), several data transmission modes (e.g., a Point-to-Point (PTP) mode and a Point-to-Multipoint (PTM) mode) for MBS are mixed on some area, and the use cases identified could get benefit from this feature including (but are not limited to) public safety and mission critical, Vehicle to Everything (V2X) applications, transparent Internet Protocol version 4 (IPv4)/IPv6 multicast delivery, Internet Protocol Television (IPTV), software delivery over wireless, group communications and Internet of Everything (IoT) applications, and etc.

SUMMARY

One embodiment of the subject application provides a method performed by a user equipment (UE) for data transmission, comprising receiving data packets in a first cell in a first mode, sending a data receiving status report during or after a handover and/or during or after a data transmission mode switching, receiving missing data packets during the data transmission mode switching and/or during the handover, and receiving data packets in a second cell in a second mode.

Another embodiment of the subject application provides a method performed by a base station (BS) for data transmission, comprising transmitting data packets in a first mode in a first cell, receiving a data receiving status report during or after a handover and/or during or after a data transmission mode switching, transmitting missing data packets during the data transmission mode switching and/or during the handover according to the data receiving status report, and transmitting data packets in a second cell in a second mode.

A further embodiment of the subject application provides a method performed by a source BS for data transmission, comprising transmitting data packets in a first mode in a first cell, sending a multicast and broadcast service (MBS) receiving status to a target BS during a handover, wherein the MBS receiving status at least includes a service identifier (ID) and the first mode associated with a data transmission, and forwarding missing data packets during the handover and/or during a data transmission mode switching to the target BS, and stopping transmitting data packets in the first mode in the first cell.

A further embodiment of the subject application provides a method performed by a target BS for data transmission, comprising receiving a MBS receiving status from a source BS during a handover, wherein the MBS receiving status includes at least a service ID and a first mode associated with a data transmission, receiving a data receiving status report during or after a handover and/or during or after a data transmission mode switching, receiving missing data packets during the handover and/or during the data transmission mode switching from the source BS and forwarding the missing data packets according to the data receiving status report, and transmitting data packets in the second mode.

Yet another embodiment of the subject application provides an apparatus, which indicates a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method performed by a UE. The method comprises receiving data packets in a first cell in a first mode, sending a data receiving status report during or after a handover and/or during or after a data transmission mode switching, receiving missing data packets during the data transmission mode switching and/or during the handover, and receiving data packets in a second cell in a second mode.

Yet another embodiment of the subject application provides an apparatus, which indicates a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method performed by a BS. The method comprises transmitting data packets in a first mode in a first cell, receiving a data receiving status report during or after a handover and/or during or after a data transmission mode switching, transmitting missing data packets during the data transmission mode switching and/or during the handover according to the data receiving status report, and transmitting data packets in a second cell in a second mode.

A further embodiment of the subject application provides an apparatus, which indicates a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method performed by a source BS. The method comprises comprising transmitting data packets in a first mode in a first cell, sending a multicast and broadcast service (MBS) receiving status to a target BS during a handover, wherein the MBS receiving status at least includes a service identifier (ID) and the first mode associated with a data transmission, and forwarding missing data packets during the handover and/or during a data transmission mode switching to the target BS, and stopping transmitting data packets in the first mode in the first cell.

A further embodiment of the subject application provides an apparatus, which indicates a non-transitory computer-readable medium having stored thereon computer-executable instructions, a receiving circuitry, a transmitting circuitry, and a processor coupled to the non-transitory computer-readable medium, the receiving circuitry and the transmitting circuitry, wherein the computer-executable instructions cause the processor to implement a method performed by a target BS. The method comprises receiving a MBS receiving status from a source BS during a handover, wherein the MBS receiving status includes at least a service ID and a first mode associated with a data transmission, receiving a data receiving status report during or after a handover and/or during or after a data transmission mode switching, receiving missing data packets during the handover and/or during the data transmission mode switching from the source BS and forwarding the missing data packets according to the data receiving status report, and transmitting data packets in the second mode.

BRIEF DESCRIPTION OF THE DRAWINGS

Some example embodiments will now be described, by way of non-limiting examples, with reference to the accompanying drawings.

DETAILED DESCRIPTION

The detailed description of the appended drawings is intended as a description of the preferred embodiments of the present invention, and is not intended to represent the only form in which the present invention may be practiced. It should be understood that the same or equivalent functions may be accomplished by different embodiments that are intended to be encompassed within the spirit and scope of the present invention.

Reference will now be made in detail to some embodiments of the present application, examples of which are illustrated in the accompanying drawings. To facilitate understanding, embodiments are provided under specific network architecture and new service scenarios, such as 3GPP 5G and so on. It is contemplated that along with developments of network architectures and new service scenarios, all embodiments in the present application are also applicable to similar technical problems, and moreover, the terminologies recited in the present application may change, which should not affect the principle of the present application.

The present disclosure generally relates to data transmission for MBS. For example, a UE may receive data from a BS in a PTP mode or in a PTM mode. Furthermore, for example, due to radio link quality change, stricter Quality of Service (QoS) requirement or other conditions change, the network my decide to move the UE to the PTP mode or move the UE to the PTM mode for the MBS data transmission. For example, if the radio link quality decreases, a PTP mode may be used for the UE to receiving data from the BS; and if the radio link quality is improved, a PTM mode may be used for the UE to receive data from the BS.

The switching of the data transmission mode may be realized through an application layer based solution. However, the continuity and lossless of the data transmission may not be guaranteed if a data transmission mode is switched and/or a handover happens. For example, in Long Term Evolution (LTE), a Single-Cell PTM (SC-PTM) uses an application layer based solution to support the data transmission mode switching between the PTP mode and the PTM mode, the switching delay is possibly more than 200 ms. If the data transmission mode switching is accompanied with a handover, the switching delay may be more. Furthermore, during the data transmission mode switching and/or the handover, some data packets may be possibly lost.

The switching of the data transmission mode may be realized entirely in the Radio Access Network (RAN) layer. The solution based on RAN layer decrease the switching delay significantly, it allows the UE to switch between the PTP mode and the PTM mode more efficiently. The same tunnel for the MBS flow may be used regardless whether the RAN is using PTM mode or a PTP mode or both in a specific cell. The RAN based solution targets any applications/UEs that indicate its interest (e.g. join/leave) in receiving an MBS service.

Figure 1:
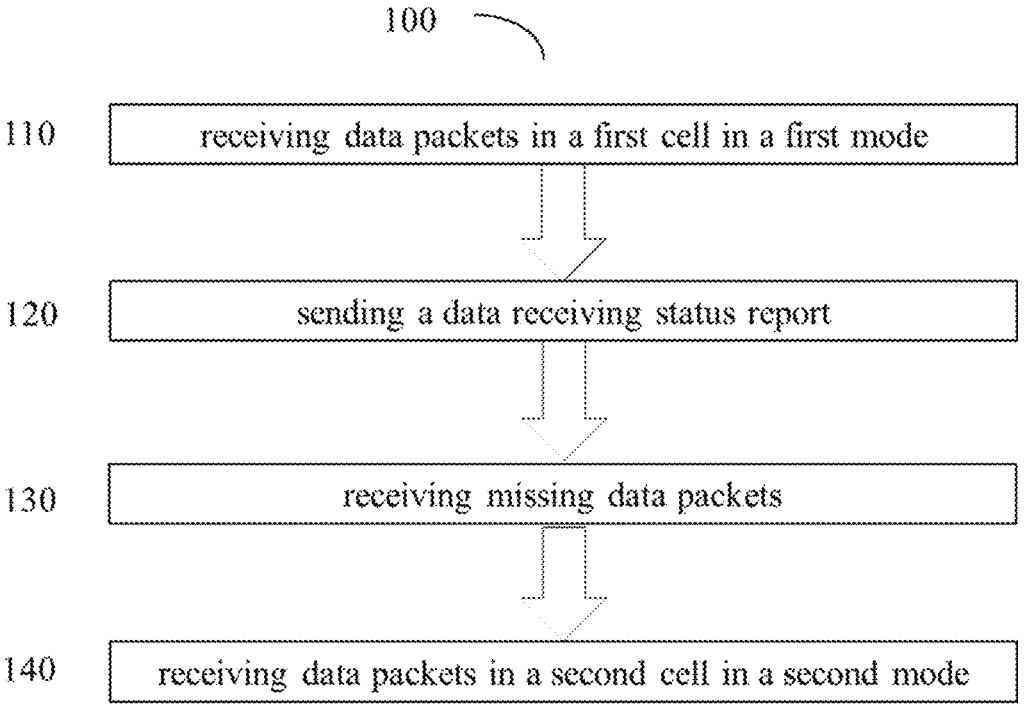
FIG. 1 illustrates an example RAN based method for MBS.

FIG. 1 illustrates an exemplary RAN based method 100 performed by a UE to receive data packets from a BS for MBS. As shown in FIG. 1, the method 100 may include a step 110 of receiving data packets in a first mode in first cell, a step 120 of sending a data receiving status report to a BS during or after a handover from the first cell to a second cell and/or during or after a data transmission mode switching from the first mode to a second mode, a step 130 of receiving missing data packets during or after the data transmission mode switching and/or during or after the cell handover according to the data reception status report, and a step 140 of receiving data packets in a second mode in a second cell. The data receiving status report is used to make a lossless data transmission.

In some embodiments, each of the first mode and the second mode may be one of a PTP mode and a PTM mode, and be associated with a first bearer and a second bearer respectively.

In some embodiments, each of the first bearer and the second bearer may support both the first mode and the second mode.

In some embodiments, each of the first bearer and the second bearer is one of a multicast bearer used for data transmission in the PTM mode and a unicast bearer used for data transmission in PTP mode. In some embodiments, the multicast bearer is scrambled by a group radio network temporary identifier (G-RNTI) in at least one cell, and the unicast bearer is scrambled by a cell radio network temporary identifier (C-RNTI).

Figure 2:
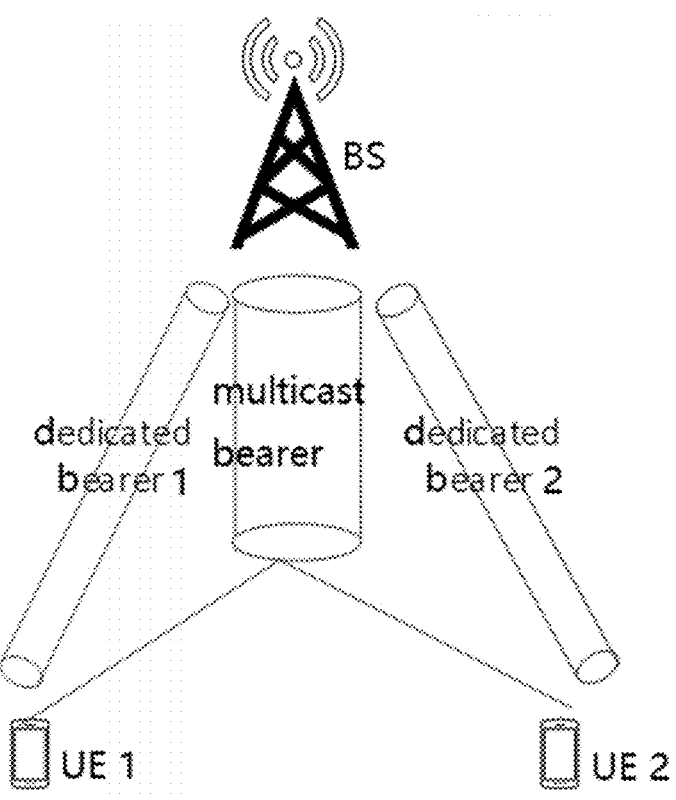
FIG. 2 illustrates dedicated bearers associated with a multicast bearer.

As the multicast bearer is a cell or a multicast area specific, it is not suitable to use the multicast bearer to send or receive UE specific information. Therefore, in some embodiments, a dedicated bearer associated with the multicast bearer is established for transmitting or receiving the UE specific information (e.g., a data receiving status report, or a last packet indication or an end marker for stopping a data transmission mode or missing data packets). In some embodiments, the dedicated bearer may be same as the unicast bearer FIG. 2 illustrates dedicated bearers associated with a multicast bearer. As shown in FIG. 2, the BS transmits the data packets to UE 1 and UE 2 in the PTM mode via a multicast bearer. Two dedicated bearer are set up to be associated with the multicast bearer to send or receive UE specific information for UE 1 and UE 2 respectively.

In some embodiments, in order to support the service continuity or the data transmission continuity, and in order to support the lossless of the data transmission, a common sequence numbering function for the data packet transmission. The data receiving status report is associated with a common sequence number (SN), wherein the common SN is shared by the PTM mode and the PTP mode, and/or shared by different cells, and/or shared by different BSs. Based on the data receiving status report associated with the common SN, the BS know well which data packets are correctly received by the UE and which data packets are missing. In some embodiments, the common sequence number is a Packet Data Convergence Protocol (PDCP) SN or PDCP count value.

In some embodiments, the data receiving status report includes at least one of the following items: a maximum common SN or count value for the data packets received in the first mode, a bitmap indicating which data packets are missing and which packets are correctly received, a common SN or count value of a first missing packet when receiving data packets in the first mode, and a combined data receiving status for the first mode and the second mode and/or in the first cell and in the second cell. If the second mode is the PTM mode, the data receiving status report further includes at least a minimum common SN or count value of data packets received among all the UEs in the second mode.

In some embodiments, the data receiving status report is sent by the UE based on at least one of: stopping receiving data packets in the first mode, receiving a deactivation indication or a removal indication of a data transmission in the first mode, receiving an activation indication or an addition indication of the data transmission in the second mode, and receiving of a last packet indication or an end marker.

In some embodiments, a data transmission mode switching happens without a handover, the first cell and the second cell are a same cell, and the first mode and the second mode are different modes.

In some embodiments, a handover happens without a data transmission mode switching, the first cell and the second cell are different cells, and the first mode and the second mode are a same mode. Furthermore, in some embodiments, the BS of the first cell and the BS of the second cell may be a same BS or different BSs.

Figure 3:
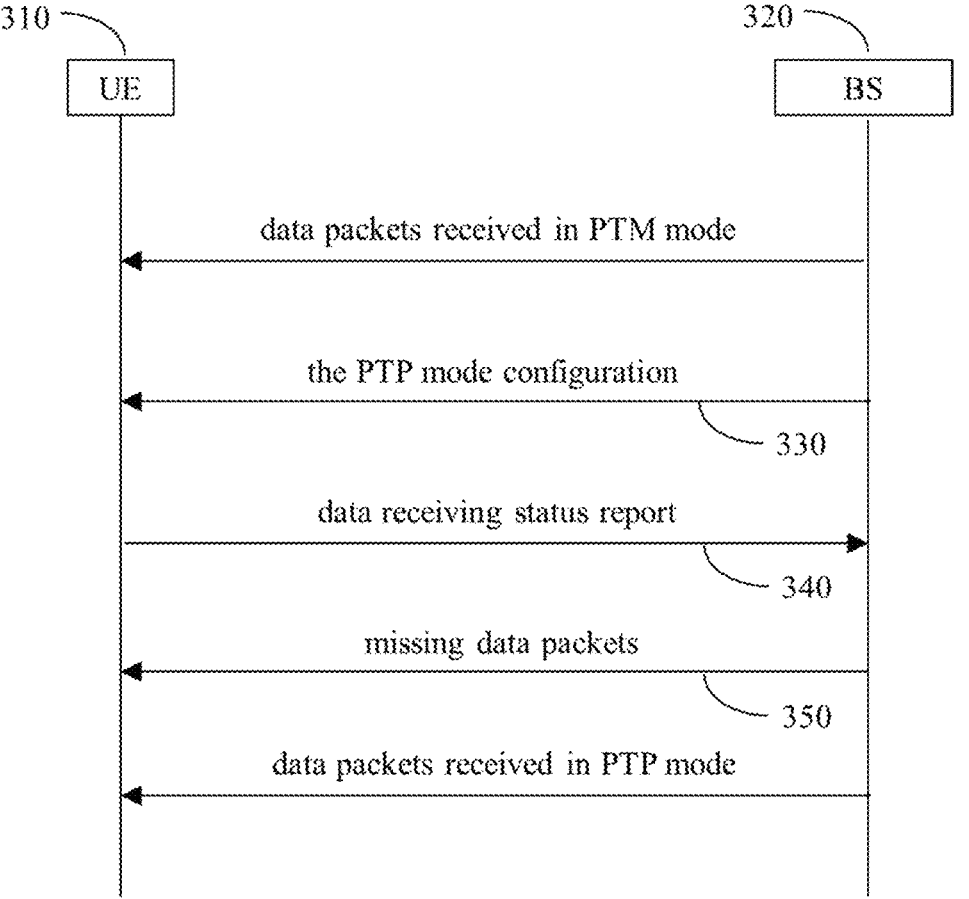
FIG. 3 illustrates an exemplary signal sequence for switching from the PTM mode to the PTP mode without a handover.

FIG. 3 illustrates a signal sequence of the method 100 according to a first embodiment of the present application. As shown in FIG. 3, a data transmission mode is switched from the PTM mode to the PTP mode without a handover, the first cell and the second cell are a same cell. The first mode is the PTM mode and the second mode is the PTP mode.

Please refer to FIG. 3 together with FIG. 1. In this embodiment, in step 110, a UE 310 receives the data packets in PTM mode from the BS 320. A multicast bearer is established for the data transmission, and a dedicated bearer may be established associated with the multicast bearer for UE specific info. Due to some reasons, for examples, the radio quality decreases, QoS requirement is stricter, and other conditions change, the network may decide to switch the UE 310 to be in PTP mode for data packets reception.

The network may configure a unicast bearer, and the unicast bearer may be inactive or active by default, and may be activated or deactivated by a signalling. In order to support service continuity and losses data transmission, a common SN is shared by both the PTP mode and the PTM mode. The common sequence numbering function may be located in a (PDCP) layer or a Radio Link Control (RLC) layer.

The BS 320 sends a PTP mode configuration 330 to the UE 310, wherein the PTP mode configuration 330 may contain a signalling for activating the PTP mode. The UE 310 applies the PTP mode configuration 330, and if the PTP mode is activated, the UE 310 may stop receiving the data packet in the PTM mode and start to receiving the data packets in the PTP mode, or the UE 310 may receive the data packets in both PTM mode and the PTP mode, and stop receiving the data packets in PTM mode upon receiving a last packet indication or an end marker via a dedicated bearer associated with the multicast bearer. The PTP mode configuration may be included in a Radio Resource Control (RRC) Reconfiguration message or carried by a Medium Access Control Element (MAC CE) or a Downlink Control Information (DCI).

In some embodiments, the end marker or the last packet indication is in a PDCP control Protocol Data Unit (PDU) or in the header of a PDCP User PDU.

Figure 14:
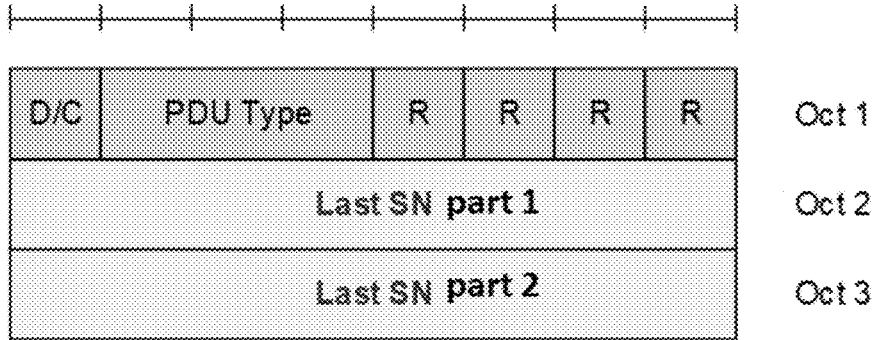
FIG. 14 illustrates an exemplary last package indication.

One example of the last packet indication is shown in FIG. 14. The last packet indication is in the PDCP control PDU, and it is a 16-bit number occupying two octets (i.e., Oct 2 and Oct 3 shown in FIG. 14). In FIG. 14, "D/C" means "data/control" type, and "R" means the bit being reserved.

Figure 15:
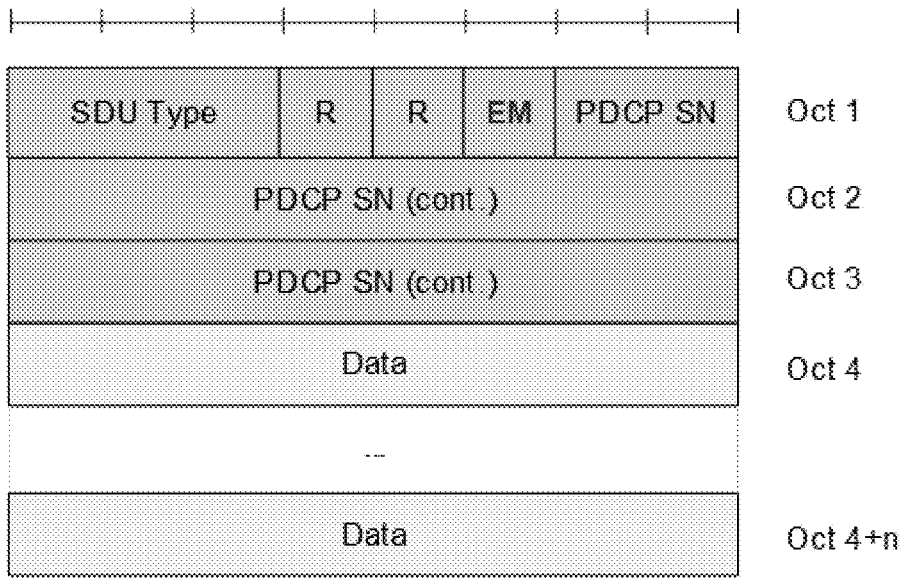
FIG. 15 illustrate an exemplary end marker.

One example of the end marker is shown in FIG. 15. The end marker is added in the header of the PDCP user PDU and shown as "EM". Upon detection the end maker indication in the header, the associated packet is the last packet from PTM mode.

The end marker or the last packet indication may be sent by a MAC CE, in this case, the multicast bearer identifier or the unicast bearer identifier is explicitly indicated together with the last packet indication or the end marker.

During the data transmission mode switching, some data packets are possibly lost. In step 120, during or after the data transmission mode switching, the UE 310 sends the data receiving status report 340 to the BS 320 via a unicast bearer or a dedicated bearer upon, for example, stopping receiving the data in the PTM mode (e.g., receiving a deactivation indication or a removal indication of a data transmission in the PTM mode). The data receiving status report 340 may include the maximum common SN or count value of the received data packets in sequence, or a bitmap of the receiving data packets status (i.e., a bitmap indicates which data packets are missing and which data packets are correctly received), or a common SN or count value of the first missing data packet, or a combined data receiving status for the PTM mode and the PTP mode.

The data receiving status report 340 is sent at least based on stopping receiving data packets in the PTM mode, or receiving a deactivation indication or a removal indication of a data transmission in the PTM mode, or receiving an activation indication or an addition indication of the data transmission in the PTP mode, or receiving a last packet indication or an end marker.

To secure the lossless data transmission, in step 130, after receiving the data receiving status report 340, the BS of the first cell (i.e., the BS of the second cell) sends the missing data packets 350 to the UE 310 via the unicast bearer or the dedicated bearer, according to the data receiving status report 340.

In step 140, the UE 310 starts to receive the data packets in PTP mode in the first cell.

Figure 4:
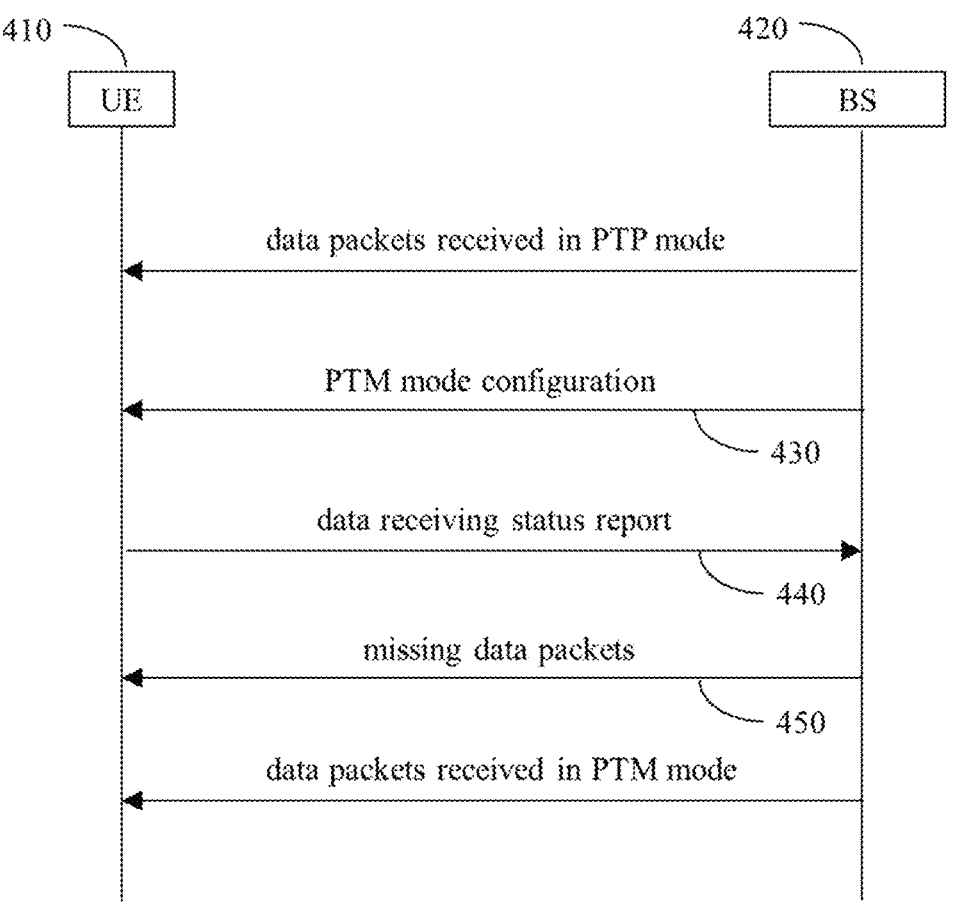
FIG. 4 illustrates an example of signal sequence for switching from the PTP mode to the PTM mode without a handover.

FIG. 4 illustrates a signal sequence of the method 100 according to a second embodiment of the present application. As shown in FIG. 4, a data transmission mode is switched from the PTP mode to the PTM mode without a handover, the first cell and the second cell are a same cell, and the first mode is the PTP mode and the second mode is the PTM mode.

Please refer to FIG. 4 together with FIG. 1. In this embodiment, in step 110, a UE 410 receives the data packets in PTP mode from the BS 420, an MBS unicast bearer is established for the data transmission. Due to some reasons, for examples, the radio quality increase, QoS requirement becomes looser, and other conditions change, the network may decide to switch the UE 410 to be in PTM mode for data packets receiving.

The network may configure a multicast bearer and an associated dedicated bearer, and the multicast bearer may be inactive or active by default. The multicast bearer may be activated or deactivated by a signalling. In order to support service continuity and secure losses data transmission, a common sequence numbering function is shared by both the PTP mode and the PTM mode. The common sequence numbering function may be located in the PDCP layer or the RLC layer.

The BS 420 sends a PTM mode configuration 430 to the UE 410, wherein the PTM mode configuration 430 may contain a signalling for activating the PTM mode. The UE 410 applies the PTM mode configuration 430, if the PTM mode is activated, the UE 410 may stop receiving the data packets in the PTP mode and start to receiving the data packets in the PTM mode, or the UE 410 may receive the data packets in both the PTM mode and the PTP mode, and stop receiving the data packets in the PTP mode after at least all missing data packets are received taking both data packets in the PTP mode and the PTM mode into account. The PTM mode configuration 430 may be included in a RRC Reconfiguration message or the PTM mode configuration 430 is carried by a MAC CE or DCI.

During the data transmission mode switching, some data packets may be lost. In step 120, during or after the data transmission mode switching, the UE 410 sends a data receiving status report 440 to the BS 420 via the unicast bearer or the dedicated bearer.

In some embodiments, the UE 410 sends the data receiving status report 410 at least based on stopping receiving data packets in the PTP mode, or receiving a deactivation indication or a removal indication of a data transmission in the PTP mode, or receiving an activation indication or an addition indication of the data transmission in the PTM mode, or receiving a last packet indication or an end marker. The data receiving status report 340 may include a maximum common SN of the receiving data packets status (a bitmap indicates which data packets are missing and which data packets are correctly received), or a common SN or count value of the first missing data packet, or a combined data receiving status for the PTP mode and the PTM mode. Furthermore, the data receiving status report 440 may include at least a minimum common SN or count value of data packets received in the PTM mode.

To secure the lossless data transmission, in step 130, after receiving the data receiving status report 440, the BS 420 sends the missing data packets 450 to the UE 410 via the unicast bearer or the dedicated bearer according to the data receiving status report 440.

For example, the minimal receiving data packet in the PTM mode is data packet #4 (i.e., the minimum common SN or count value is 4), the UE 410 need at least to receive the data packets in the PTP mode until all the data packets before the data packet #4 are received, then the UE 410 may stop the data reception in the PTP mode. Furthermore, a timer may be configured, if the timer expiry, the UE 410 may stop receiving the data packets in the PTP mode even if not all the missing data packets before the data packet #4 are received.

In step 140, the UE 410 starts to receive the data packets in the PTM mode.

In some embodiments, the UE hands over from the first cell to the second cell without a data transmission mode switching, i.e., the first mode and the second mode are a same mode, and the first cell and the second cell are different cells. In the step 120, the UE sends the data receiving status report to the BS of the second cell during or after the handover.

Figure 5:
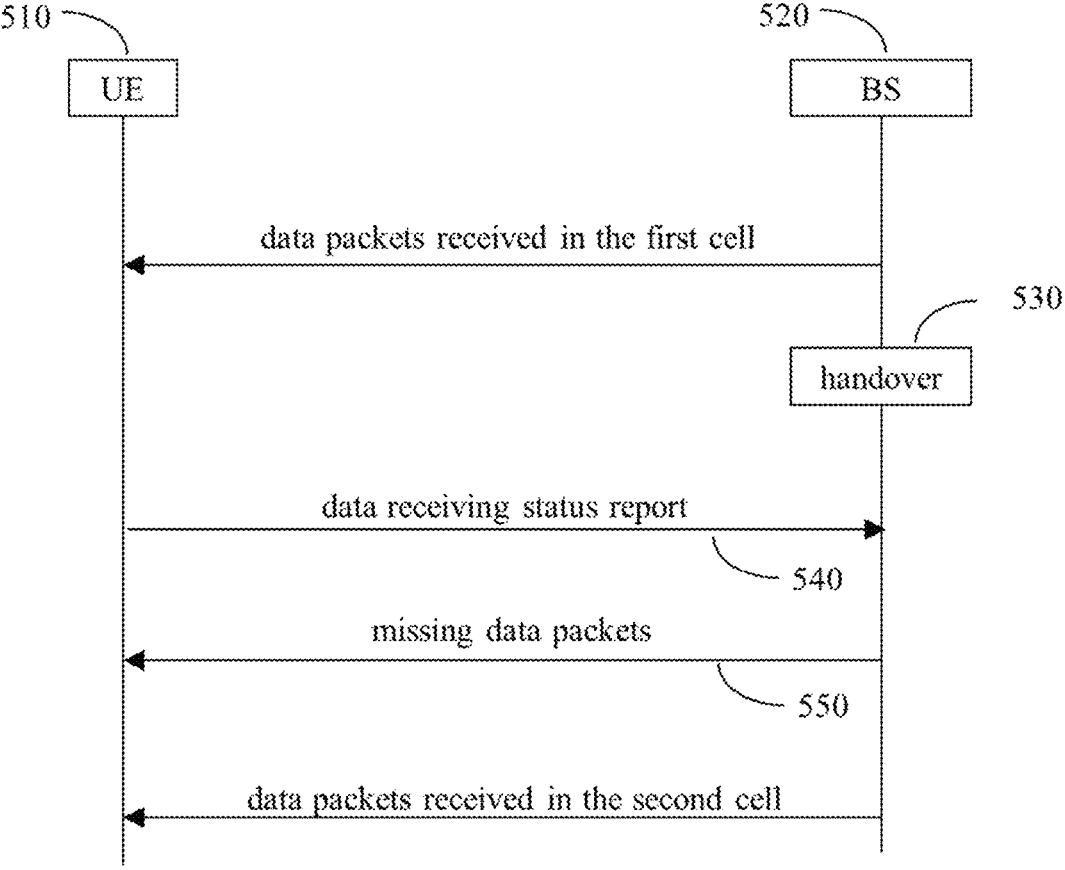
FIG. 5 illustrates an example of signal sequence for a handover under a same BS without a data transmission mode switching.

FIG. 5 illustrates a signal sequence of the method 100 according to a third embodiment of the present application. A handover from the first cell to the second cell happens without a data transmission mode switching, the first mode and the second mode are a same mode, and the BS of the first cell and the BS of the second cell are a same cell, i.e., the BS 520.

Please refer to FIG. 5 together with FIG. 1. In this embodiment, in step 110, at the beginning, a UE 510 receives the data packets in the first mode in the first cell. If the UE 510 move to the second cell, a handover 530 happens; however, the BS 520 decides not to switch the data transmission mode.

During the handover, some data packets are possibly missing. In order to support service continuity and secure losses data transmission, a common sequence numbering function is shared when receiving the data packets in the first cell and when receiving the data packets in the second cell. The common sequence numbering function may be located in the PDCP layer or the RLC layer.

When the UE 510 moves from the first cell to the second cell, a handover 530 happens. During the handover 530, some data packets may be lost. To support the support service continuity and the lossless data transmission, in step 120, the UE 510 sends a data receiving status report 540 associated with a common SN to the BS 520. The data receiving status report 540 may include the maximum SN of the receiving data packets in sequence, or a bitmap of the receiving data packets status (a bitmap indicates which data packets are missing and which data packets are correctly received), or a common SN or count value of the first missing data packet, or a combined data receiving status in the first cell and in the second cell.

To secure the lossless data transmission, in step 130, after receiving the data receiving status report 540, the BS 520 sends the missing data packets 550 to the UE 510 via the unicast bearer or the dedicated bearer according to the data receiving status report 540.

In step 140, after the cell handover, the UE 510 receives the data packets in the first mode in the second cell.

In some embodiments, if first mode and the second mode are the PTM mode, the data receiving status report 540 further includes a minimum common SN or count value for data packets received in the PTM mode among all related UEs.

Figure 6:
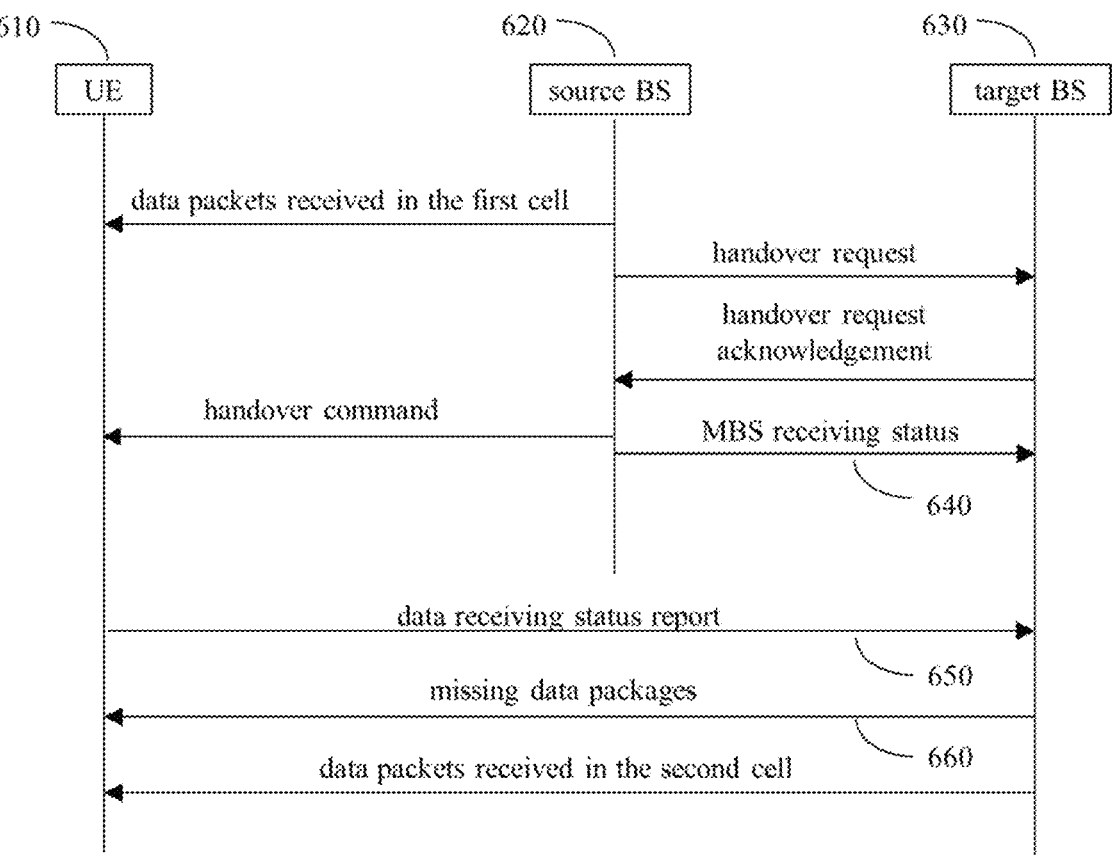
FIG. 6 illustrates an example of signal sequence for a handover between different BSs without a data transmission mode switching.

FIG. 6 illustrates a signal sequence of the method 100 according to a fourth embodiment of the present application. As shown in FIG. 6, a handover from the first cell to the second cell happens without a data transmission mode switching, the first mode and the second mode are a same mode, and the BS 620 of the first cell and the BS 630 of the second cell are different BSs.

Please refer to FIG. 6 together with FIG. 1. In this embodiment, in step 110, at the beginning, a UE 610 receives the data packets in the first cell, the BS of the first cell is the source BS 620. If the UE 510 move to the second cell, the BS 620 sends a handover request to the target BS 630 of the second cell, the target BS 630 sends a handover request acknowledgement to the source BS 620, and then the source BS 620 sends a handover command to the UE 610. A handover happens and a connection between the UE 810 and the target BS 830 is set up. During the handover procedure, the target BS 630 decides not to switch the data transmission mode.

During the handover procedure, the source BS 620 sends a MBS receiving status 640 to the target BS 630 in the handover procedure. The MBS receiving status 640 includes the service ID that the UE 610 is interested in or receiving, and includes the mode type of the first mode. The service ID could be a 5G MBS session ID, or a Temporary Mobile Group Identifier (TMGI), or a Multi Radio Bearer (MRB) ID or a unicast Data Radio Bearer (DRB) ID. In some embodiments, the MBS receiving status 640 may be included in the handover request message. In some embodiments, the MBS receiving status 640 includes the 5G MBS bearer configuration (e.g. the mode type, RRC configuration) of the UE in the source BS 620.

In some embodiments, the source BS 620 may send data packets during the handover and/or during a data transmission mode switching to the target BS 630.

During the handover procedure, some data packets are possibly missing. In step 120, during or after the handover procedure, to support service continuity and the lossless data transmission, the UE 610 sends the data receiving status report 650 to the target BS 630.

If the data transmission mode is the PTM mode (i.e., the first mode and the second mode are the PTM mode), the data receiving status report 650 may further include a minimum common SN or count value for data packets received in the PTM mode.

In step 130, the target BS 630 sends the missing data packets 660 to the UE 610 according to the data receiving status report 650 via the unicast bearer or the dedicated bearer.

In order to support service continuity and secure losses data transmission, the data receiving status report is associated with a common SN. The common SN is shared when receiving the data packets in the first cell and when receiving the data packets in the second cell.

In step 140, after the handover procedure, the UE 610 starts to receive data packets in the second cell.

In some embodiments, the UE hands over from the first cell to the second cell, and the data transmission mode for receiving the data packets is switched from the PTP mode to the PTM mode or from the PTM mode to the PTP mode, i.e., the first cell and the second cell are different cells, and the first mode and the second mode are different data transmission modes.

Figure 7:
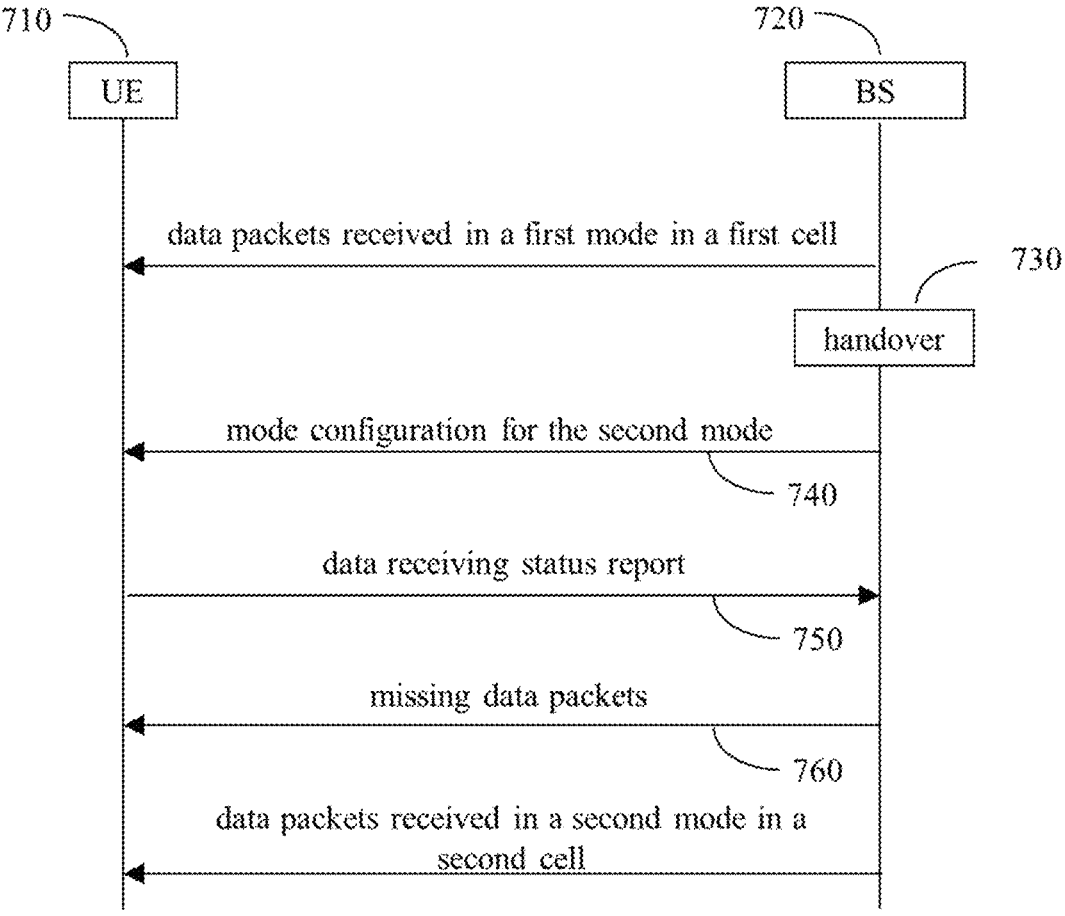
FIG. 7 illustrates an example of signal sequence for a handover under a same BS with a data transmission mode switching.

FIG. 7 illustrates a signal sequence of the method 100 according to a fifth embodiment of the present application. A handover from the first cell to the second cell happens with a data transmission mode switching, the first mode and the second mode are different transmission mode, but the BS of the first cell and the BS of the second cell are a same BS 720.

Please refer to FIG. 7 together with FIG. 1. In this embodiment, in step 110, at the beginning, a UE 710 receives the data packets in the first mode in the first cell. If the UE 710 moves to the second cell, a handover 730 happens. The BS 720 decides that the data transmission mode for the UE 710 in the second cell is a second mode different to the first mode.

The BS 720 sends a mode configuration 740 for the second mode to the UE 710. In some embodiments, the mode configuration 740 may include a signalling for activating/adding the second mode. If the second mode is the PTM mode, the BS 720 may set up a dedicated bearer associated with the multicast bearer. In some embodiments, the dedicated bearer may be same as the unicast bearer.

The UE 710 applies the second mode for data packet receiving when it moves into the second cell. During the handover 730 and the data transmission mode switching, some data packets are possibly missing.

In order to support service continuity and secure losses data transmission, in step 120, the UE 710 sends a data receiving status report 750 associated with a common SN to the BS 720 via the dedicated bearer or the unicast bearer as well.

The data receiving status report 750 may include the maximum common SN of the receiving data packets in sequence, or a bit map of the receiving data packets status (a bitmap indicates which data packets are missing and which data packets are correctly received), or a common SN or count value of the first missing data packet, or a combined data receiving status for the first mode and the second mode and/or in the first cell and in the second cell. Furthermore, if the second mode is the PTM mode, the data receiving status report 750 may further include a minimum common SN or count value of data packets received in the second mode. In some embodiments, the data packet may be a PDCP SDU or RLC SDU, e.g. the first missing data packet is the first missing PDCP SDU within the reordering window.

In step 130, after the BS 720 receives the data receiving status report 750, the BS 720 sends the missing data packets 760 to the UE 710.

In step 140, after the handover 730 and the data transmission mode switching, the UE 710 receives the data packets in the second mode in the second cell.

Figure 8:
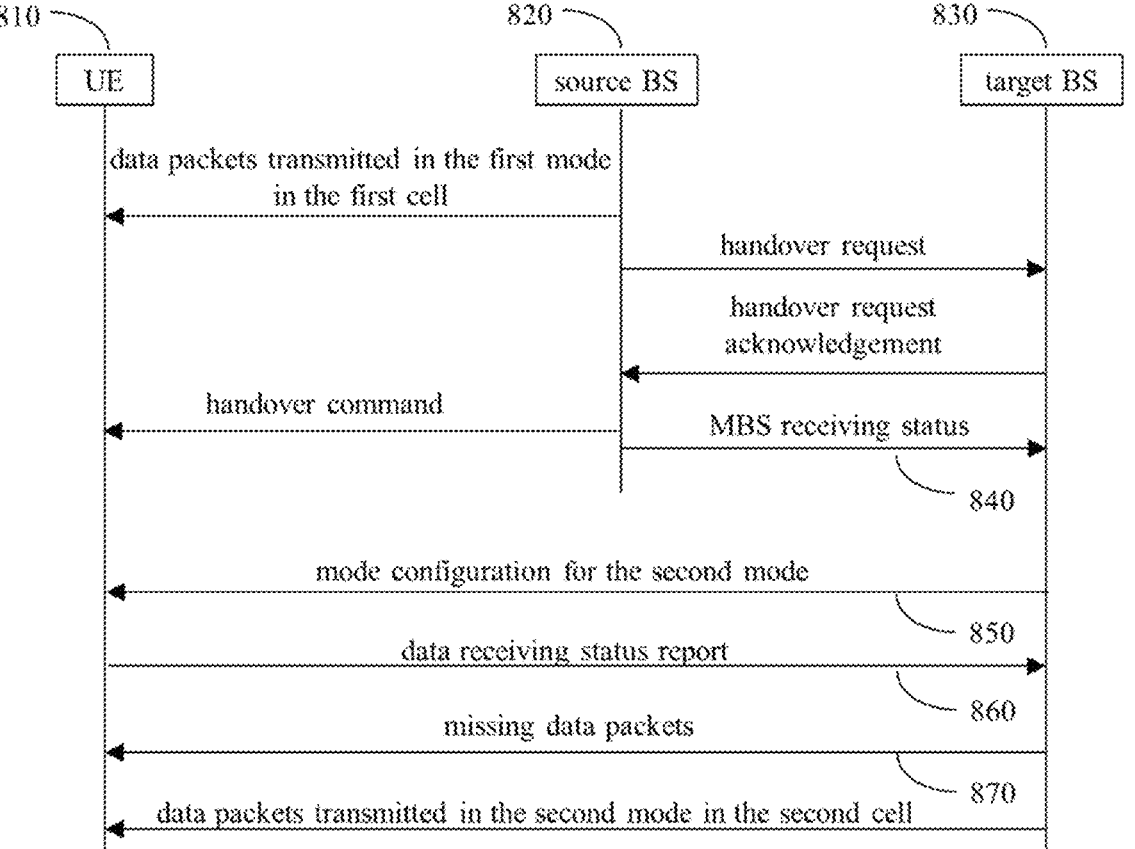
FIG. 8 illustrates an example of signal sequence for a handover between different BSs with a data transmission mode switching.

FIG. 8 illustrates a signal sequence of the method 100 according to a sixth embodiment of the present application. As shown in FIG. 8, a handover from the first cell to the second cell happens with a data transmission mode switching, the first mode and the second mode are different modes, and the source BS 820 of the first cell and the target BS 830 of the second cell are different BSs.

Please refer to FIG. 8 together with FIG. 1. In this embodiment, in step 110, at the beginning, a UE 810 receives the data packets in the first mode in the first cell, and the BS of the first cell is the source BS 820. If the UE 810 move to the second cell, the source BS 820 sends a handover request to the target BS 830 of the second cell, the target BS 830 sends a handover request acknowledge to the source BS 820, and then the source BS 820 sends a handover command to the UE 810. A handover happens and a connection between the UE 810 and the target BS 830 is set up.

During the handover, the source BS 820 sends a MBS receiving status 840 to the target BS 830. In some embodiments, the MBS receiving status 840 is contained in the handover request message. The MBS receiving status 840 may include the service ID that the UE 810 is interested in or receiving, and include the mode type of the first mode. The service ID could be 5G MBS session ID, TMGI or MRB ID or unicast DRB ID. In some embodiments, the MBS receiving status 840 includes the 5G MBS bearer configuration (e.g. the mode type, RRC configuration) of the UE in the source BS 820.

In some embodiments, the source BS 820 may send data packets during the handover and/or during a data transmission mode switching to the target BS 830.

Furthermore, the target BS 830 decides that the data transmission mode in the second cell is the second mode different from the first mode. The target BS 830 sends a mode configuration 850 for the second mode to the UE 810. The mode configuration 850 may include a signalling for activating/adding the second mode. The UE 810 applies the mode configuration 850. Furthermore, if the second mode is the PTM mode, a dedicated bearer associated with the multicast bearer of the second mode is set up. In some embodiments, the dedicated bearer may be same as the unicast bearer.

During the handover procedure, some data packets are possibly missing. In step 120, after accessing to the target BS 830, the UE 810 sends the data receiving status report 860 to the target BS 830 via the unicast bearer or the dedicated bearer. In step 130, the target BS 830 sends the missing data packets 870 to the UE 810 via the unicast bearer or the dedicated bearer, according to the data receiving status report 650.

In order to support service continuity and secure losses data transmission, the data receiving status report is associated with a common SN. The common SN is shared by the first mode and the second mode, and in the first cell and in the second cell.

In step 140, after the handover procedure together with the data transmission mode switching, the UE 810 receives the data packets in the second cell in the second mode.

In some embodiments, in step 120, if the UE stops to receive the data packets in the first mode from the first cell, the UE sends the data receiving status report.

In some embodiments, in step 120, if the UE receives a deactivation indication or a removal indication of a data transmission in the first mode, the UE sends the data receiving status report.

In some embodiments, in step 120, if the UE receives an activation indication or an addition indication of a data transmission in the second modes, the UE sends the data receiving status report.

In some embodiments, in step 120, if the UE receives a last packet indication or an end marker from the BS of the first cell, the UE sends the data receiving status report.

Figure 9:
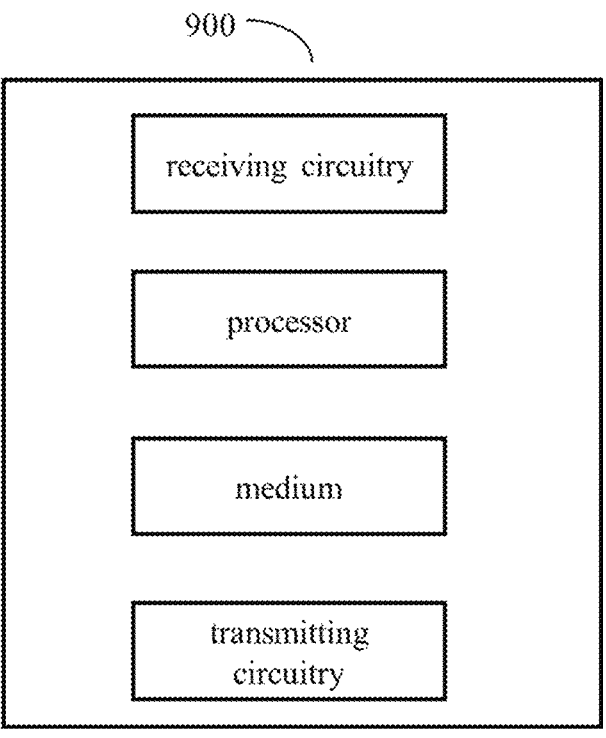
FIG. 9 illustrates an exemplary block diagram of a UE according to the embodiments of the subject disclosure.

FIG. 9 illustrates a block diagram of a UE 900 according to the embodiments of the subject disclosure. The UE 900 may include a receiving circuitry, a processor, and a transmitting circuitry. In one embodiment, the UE may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement the steps of the method 100 mentioned above with the receiving circuitry, the transmitting circuitry and the processor.

Figure 10:
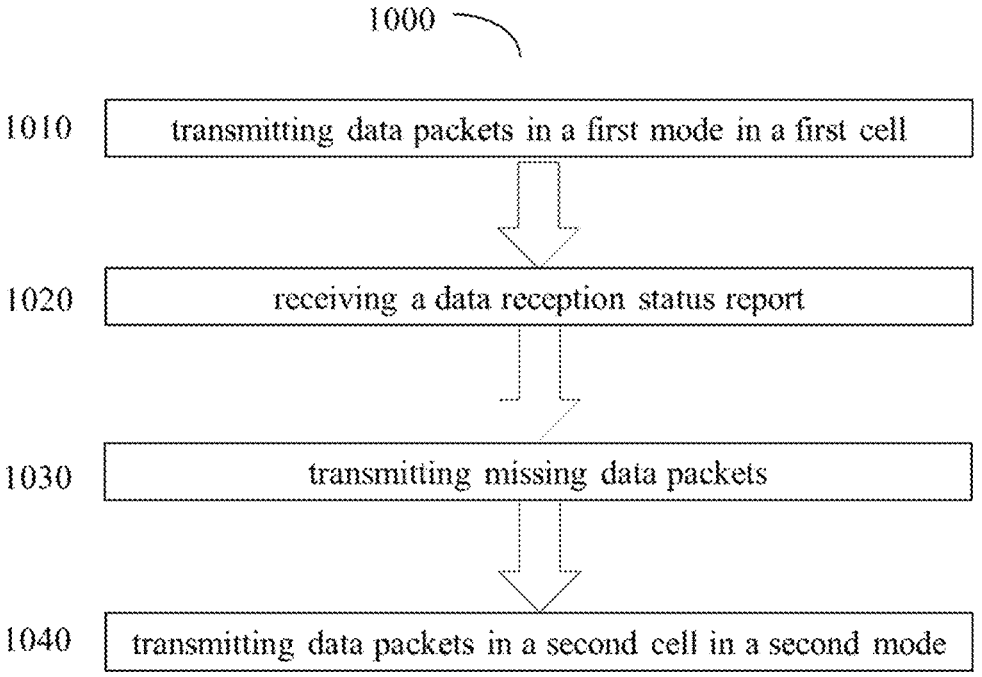
FIG. 10 illustrates an example RAN based method performed by a BS.

FIG. 10 illustrates an exemplary RAN based method 1000 performed by a BS to transmit data packets to a UE for MBS when there are a data transmission mode switching and/or a handover under the same BS happen (i.e., the first cell is different from the second cell, yet the BS of the first cell and the BS of the second cell are a same cell).

As shown in FIG. 10, the method 1000 may include a step 1010 of transmitting data packets in a first cell in a first mode, a step 1020 of receiving a data receiving status report during or after a handover from the first cell to a second cell and/or during or after a data transmission mode switching from the first mode to a second mode, a step 1030 of transmitting missing data packets according to the data reception status report, and a step 140 of transmitting data packets in a second cell in a second mode.

In some embodiments, each of the first mode and the second mode is one of a PTP mode and a PTM mode, and associated with a first bearer and a second bearer respectively, wherein each of the first bearer and the second bearer may support both the first mode and the second mode.

In some embodiments, each of the first bearer and the second bearer is one of a multicast bearer used for data transmission in the PTM mode and a unicast bearer used for data transmission in PTP mode. In some embodiments, the multicast bearer is scrambled by a group radio network temporary identifier (G-RNTI) in at least one cell, and the unicast bearer is scrambled by a cell radio network temporary identifier (C-RNTI).

As the multicast bearer is cell or multicast area specific, it is not suitable to use the multicast bearer to send or receive UE specific information. Therefore, in some embodiments, a dedicated bearer associated with the multicast bearer is established for transmitting the UE specific information (e.g., the receiving status report) or for receiving a last packet indication or an end marker for stopping a data transmission mode. In some embodiments, the dedicated bearer may be same as the unicast bearer In some embodiments, the BS triggers a UE to send the data receiving status report at least by stopping transmitting data packets in the first mode, or transmitting a deactivation indication or a removal indication of a data transmission in the first mode, or transmitting an activation indication or an addition indication of the data transmission in the second mode, or transmitting a last packet indication or an end marker.

In some embodiments, the BS receives the data receiving status report via the dedicated bearer or the unicast bearer, and transmits the missing data packets via the dedicated bearer or the unicast bearer.

In some embodiments, the BS transmits the last packet indication or the end marker to the UE via the dedicated bearer or the unicast bearer.

In some embodiments, the BS transmits the deactivation indication or the removal indication of the data transmission in the first mode via the dedicated bearer or the unicast bearer.

In some embodiments, the BS transmits the activation indication or the addition indication of the data transmission in the first mode via the dedicated bearer or the unicast bearer.

In some embodiments, the BS deactivates or removes the data transmission in the first mode by transmitting all the missing data packets or expiry of a configured timer. For example, the BS may config a timer, if the timer expiry, the BS triggers the UE to stop receiving the data packets in the first mode even if not all the missing data packets are transmitted to the UE.

Figure 11:
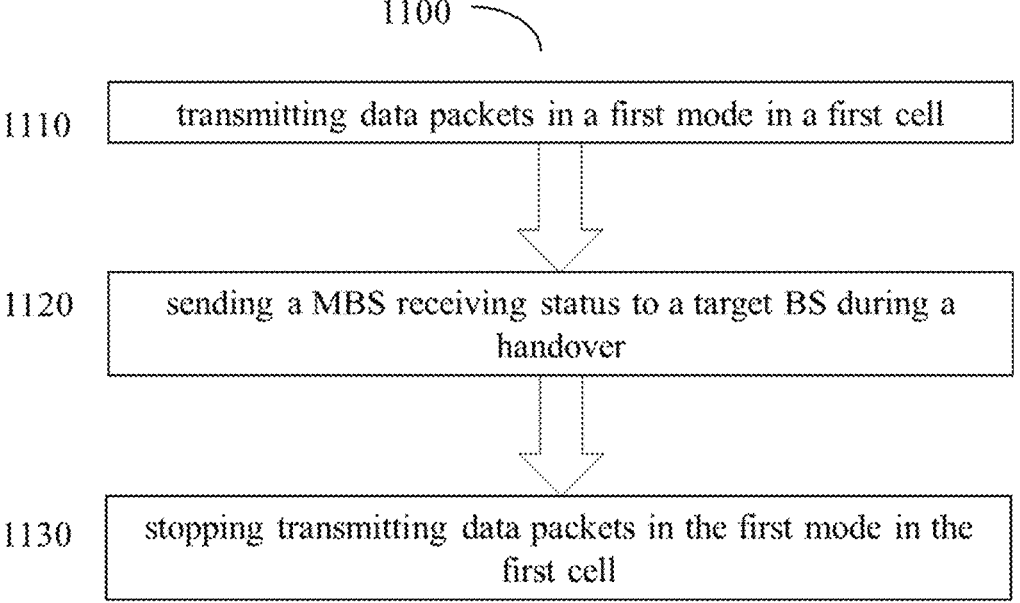
FIG. 11 illustrates an example RAN based method performed by a source BS.

FIG. 11 illustrates an exemplary RAN based method 1100 performed by a source BS for MBS when a handover to a target BS happens with/without a data transmission mode switching. As shown in FIG. 11, the method 1100 may include a step 1110 of transmitting data packets in a first cell in a first mode, a step 1120 of sending a MBS receiving status to a target base station BS during a handover, wherein the MBS receiving status may include a service ID associated with data receiving, and include the type of the data transmission mode, and a step 1130 of stopping transmitting data packets in the first mode in the first cell.

In some embodiments, the source BS may send data packets during the handover and/or during a data transmission mode switching to the target BS.

In some embodiments, the missing data packets include the data packets missing during the handover, if a data transmission mode switching happens as well, the missing data packets include the data packets missing during the data transmission mode switching.

In some embodiments, the MBS receiving status is contained in a handover request message.

In some embodiments, in step 1140, the source BS may send a last packet indication or an end marker to deactivate the first mode.

In some embodiments, if the first mode is the PTM mode, the missing data packets and the last packet indication or the end marker may be transmitted via a dedicated bearer, if the first mode is the PTP mode, they may be transmitted via a dedicated bearer or a unicast bearer.

Figure 12:
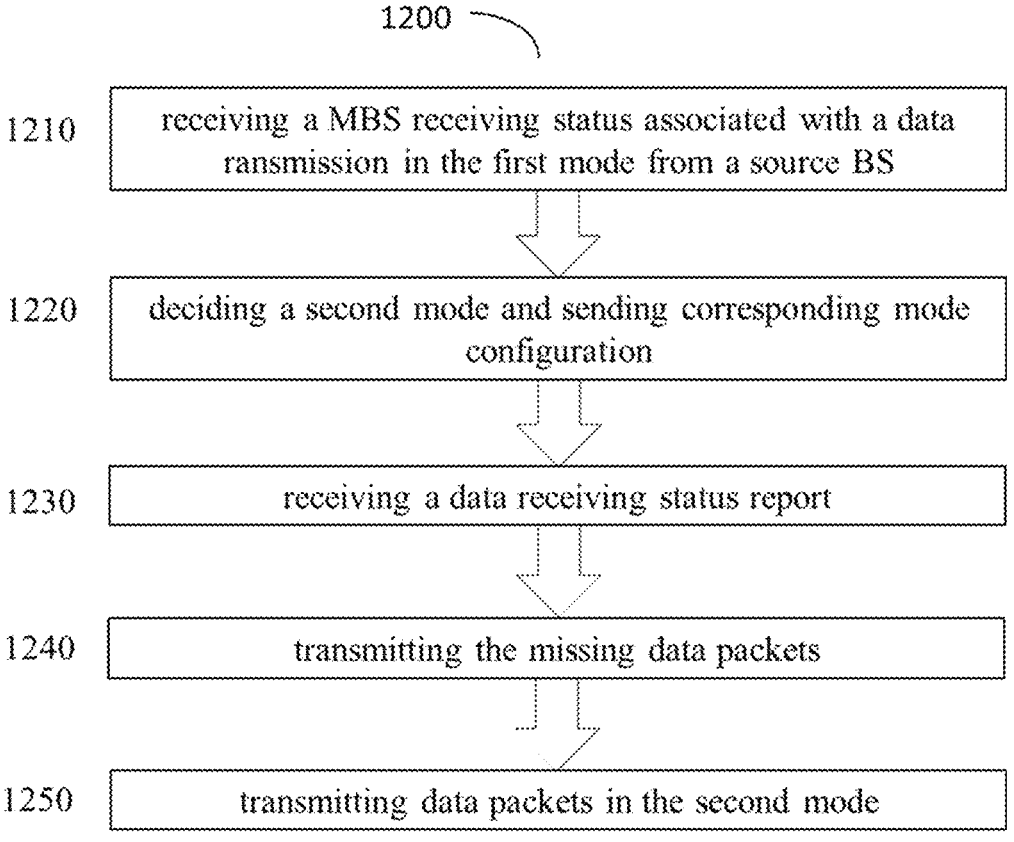
FIG. 12 illustrates an example RAN based method performed by a target BS.

FIG. 12 illustrates an exemplary RAN based method 1200 performed by a target BS for MBS when a handover from a source BS happens with/without a data transmission mode switching.

As shown in FIG. 12, in step 1210, the UE receives the data packets in the first cell in the first mode, and the BS of the first cell is the source BS. If the UE moves into a second cell under the target BS, the target BS receives a MBS receiving status from a source BS during a handover procedure. In some embodiments, the MBS receiving status is contained in the handover request message. The MBS receiving status includes at least a service ID associated with a data transmission in the first mode and the type of the first mode.

In step 1220, the target BS decides that the UE receives the data packets in the second mode in the second cell, and sends a corresponding mode configuration to the UE. In some embodiments, even if the second mode is same as the first mode, the target BS still sent corresponding mode configuration to the UE.

In step 1230, the target BS receives a data receiving status report during or after a handover and/or during or after a data transmission mode switching from the first mode to the second mode. The data receiving status report is associated with a common SN, and the common SN is shared by the source BS and the target BS, and by the first mode and the second mode.

In step 1240, the target BS transmits the missing data packets to the UE according to the data receiving status report.

In step 1250, the target BS transmits data packets to the UE in the second data transmission mode in the second cell.

In some embodiments, the first mode and the second mode are a same mode.

In some embodiments, the source BS may send data packets during the handover and/or during a data transmission mode switching to the target BS.

In some embodiments, if the second mode is the PTM mode, the target BS may set up a dedicated bearer associated with the multicast bearer for the UE specific info (e.g., the data receiving status report or the missing data packets). In some embodiments, the target BS may receive the data receiving status report via the unicast bearer or the dedicated bearer, and may transmit the missing data packets via the unicast bearer or the dedicated bearer. In some embodiments, the dedicated bearer and the unicast bearer are a same bearer.

Figure 13:
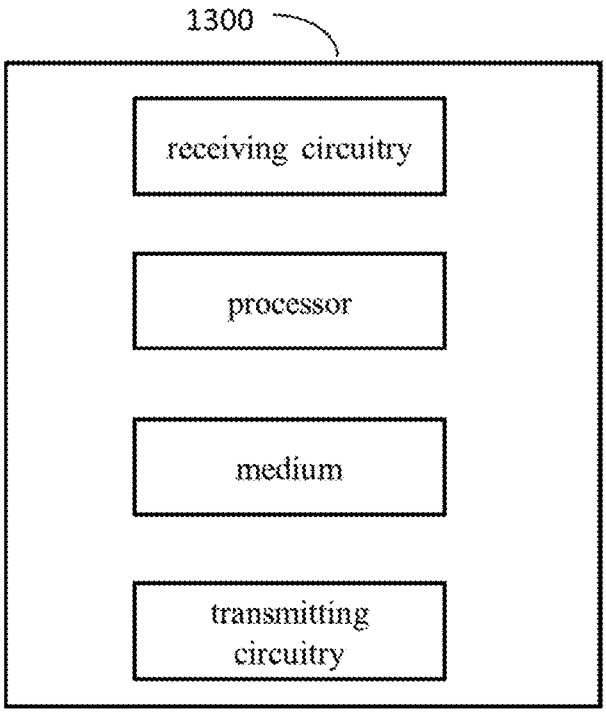
FIG. 13 illustrates an exemplary block diagram of a BS according to the embodiments of the subject disclosure.

FIG. 13 illustrates a block diagram of a BS 1300 performing the method 1000, the method 1100 or the method 1200. The BS 1300 may include a receiving circuitry, a processor, and a transmitting circuitry. In one embodiment, the UE may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement the steps shown in the methods 1000, 1100 or 1200 mentioned above with the receiving circuitry, the transmitting circuitry and the processor.

The sequence of the steps mentioned in the above embodiments can be adjusted within a reasonable range, and are not used to limit the present invention.

On the basis of not violating the principle of the present invention and on the premise of not conflicting with each other, the steps of the embodiments mentioned above can be reasonably combined as needed.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. An apparatus, comprising:
at least one memory; and
at least one processor coupled with the at least one memory and configured to cause the apparatus to:
receive data packets in a first mode;
send a data receiving status report during data transmission mode switching,
wherein the data receiving status report indicates data packets that are missing during the data transmission mode switching;
receive the missing data packets in the first mode after the data transmission mode switching; and
receive next data packets in a second mode.

2. The apparatus of claim 1, wherein sending the data receiving status report is at least based on:
stopping receiving data packets in the first mode; or
receiving a deactivation indication or a removal indication of a data transmission in the first mode; or
receiving an activation indication or an addition indication of the data transmission in the second mode; or
receiving a last packet indication or an end marker.

3. The apparatus of claim 1, wherein the data receiving status report includes a common sequence number (SN), and the common SN is shared by the first mode and the second mode.

4. The apparatus of claim 3, wherein the first mode and the second mode are one of a point-to-point (PTP) mode and a point-to-multipoint (PTM) mode, and wherein a first bearer and a second bearer are associated with the first mode and the second mode, respectively.

5. The apparatus of claim 4, wherein each of the first bearer and the second bearer supports the first mode and the second mode.

6. The apparatus of claim 4, wherein the data receiving status report includes at least one of:
a maximum SN or count value for data packets received in the first mode;
a bitmap indicating which data packets are missing and which packets are correctly received;
a SN or count value of a first missing data packet; and
a combined data receiving status for the first mode and the second mode and/or in the first cell and in the second cell.

7. The apparatus of claim 4, wherein the data receiving status report is sent via a dedicated bearer or a unicast bearer.

8. The apparatus of claim 4, the missing data packets are received via a dedicated bearer or a unicast bearer.

9. The apparatus of claim 4, further comprising:
deactivating or removing the first bearer or the first mode upon receiving of a last packet indication or an end marker via a dedicated bearer or a unicast bearer.

10. The apparatus of claim 4, further comprising:
deactivating or removing the first bearer or the first mode upon receiving all the missing data packets or expiry of a configured timer.

11. The apparatus of claim 4, wherein a multicast bearer is used for data transmission in the PTM mode and it is scrambled by a group radio network temporary identifier (G-RNTI) in at least one cell, a unicast bearer is used for data transmission in the PTP mode and is scrambled by a cell radio network temporary identifier (C-RNTI).

12. An apparatus, comprising:
at least one memory; and
at least one processor coupled with the at least one memory and configured to cause the apparatus to:
transmit data packets in a first mode;
receive a data receiving status report during data transmission mode switching,
wherein the data receiving status report indicates data packets that are missing during the data transmission mode switching;
transmit the missing data packets in the first mode after the data transmission mode switching; and
transmit next data packets in a second mode.

13. The apparatus of claim 12, further comprises triggering an apparatus to send the data receiving status report at least based on:
stopping transmitting data packets in the first mode; or
transmitting a deactivation indication or a removal indication of a data transmission in the first mode; or
transmitting an activation indication or an addition indication of the data transmission in the second mode; or
transmitting a last packet indication or an end marker.

14. The apparatus of claim 12, wherein the data receiving status report includes a common sequence number (SN), and the common SN is shared by the first mode and the second mode.

15. The apparatus of claim 14, wherein the first mode and the second mode are one of a PTP mode and a PTM mode, and wherein a first bearer and a second bearer are associated with the first mode and the second mode respectively.

16. The apparatus of claim 15, further comprising:
transmitting a last packet indication or an end marker via a dedicated bearer or a unicast bearer for deactivating or removing the first bearer.

17. The apparatus of claim 15, further comprising:
deactivating or removing the first bearer or the first mode upon transmitting all the missing data packets or expiry of a configured timer.

18. A user equipment (UE) for wireless communication, comprising:
at least one memory; and
at least one processor coupled with the at least one memory and configured to cause the UE to:
receive data packets in a first transmission mode in a first cell;
send a data receiving status report during or after a handover from the first cell to a second cell or during or after a data transmission mode switching from the first transmission mode to a second transmission mode,
wherein one of the first transmission mode and the second transmission mode is a Point-to-Point (PTP) mode and the other of the first transmission mode and the second transmission mode is a Point-to-Multipoint (PTM) mode;
receive missing data packets in the first transmission mode after or during the data transmission mode switching or after or during the handover; and
receive next data packets in the second transmission mode, respectively.

19. The UE of claim 18, wherein the data receiving status report includes a common sequence number (SN), and the common SN is shared by the first transmission mode and the second transmission mode.

20. A base station (BS) for wireless communication, comprising:

at least one memory; and at least one processor coupled with the at least one memory and configured to cause the BS to:

transmit data packets in a first transmission mode to a user equipment (UE);

receive a data receiving status report from the UE during or after a handover from a first cell to a second cell or during or after a data transmission mode switching from the first transmission mode to a second transmission mode, wherein one of the first transmission mode and the second transmission mode is a Point-to-Point (PTP) mode and the other of the first transmission mode and the second transmission mode is a Point-to-Multipoint (PTM) mode;

transmit missing data packets to the UE in the first transmission mode during or after the data transmission mode switching or during or after the handover according to the data receiving status report; and transmit next data packets to the UE in the second transmission mode.

* * * * *